Inventor
HENRY MAGNUSKI
BY
Mueller, Aichele & Rauner
ATTYS.

Oct. 6, 1970 H. MAGNUSKI 3,532,988

DIGITAL TROPOSCATTER MULTIPLEX COMMUNICATION SYSTEM OPTIMUM FREQUENCY

Filed Jan. 23, 1969 4 Sheets-Sheet 2

Inventor
HENRY MAGNUSKI
BY
Mueller, Aichele & Rauner
ATTYS.

Inventor
HENRY MAGNUSKI
BY Mueller, Aichele & Rauner
ATTYS.

Oct. 6, 1970 H. MAGNUSKI 3,532,988

DIGITAL TROPOSCATTER MULTIPLEX COMMUNICATION SYSTEM OPTIMUM FREQUENCY

Filed Jan. 23, 1969 4 Sheets-Sheet 4

Inventor
HENRY MAGNUSKI
BY
Mueller, Aichele & Rauner
ATTYS.

3,532,988

DIGITAL TROPOSCATTER MULTIPLEX COMMUNICATION SYSTEM OPTIMUM FREQUENCY

Henry Magnuski, Glenview, Ill., assignor to Motorola, Inc., Franklin Park, Ill., a corporation of Illinois Continuation-in-part of application Ser. No. 524,618, Feb. 2, 1966. This application Jan. 23, 1969, Ser. No. 814,488
Int. Cl. H04b 7/02, 7/22; H04j 3/00
U.S. Cl. 325—56 14 Claims

ABSTRACT OF THE DISCLOSURE

In a troposcatter communiction system having a plurality of available communication frequencies the best frequency is periodically selected from the plurality of frequencies by periodically testing each of the available frequencies. Communication signals are transmitted by time division multiplex including a synchronizing channel and the frequency testing is carried out during the transmission of the synchronizing signals.

This application is a continuation-in-part of the application of Henry Magnuski, filed Feb. 2, 1966, Ser. No. 524,618, now abandoned.

BACKGROUND OF THE INVENTION

In a line-of-sight or a troposcatter communication system using a fixed frequency, the transmitted signal is often severly degraded by deep, frequency selective fades, caused by multi-path propagation. Therefore, in a system using a fixed frequency, for reliable recovery of the transmitted information 100 or 1,000 times more transmitter power must be provided in order to have a sufficiently strong received signal when a fade 20 or 30 db deep occurs. It is relatively easy to provide additional transmitter power in line-of-sight systems when operating at powers measured in milliwatts, but it is very costly, if not impossible, to provide additional power in troposcatter systems when operating at powers which are measured in kilowatts.

Instead of providing a very powerful transmitter on a fixed frequency to combat frequency selective fading, frequency diversity systems have been used in which the same information is transmitted simultaneously by two or more transmitters on different frequencies. In such a system, if one frequency is in a deep fade, a sufficiently strong signal can be received on another frequency which may not be in deep fade at the same time. Although the total transmitted power required for a frequency diversity system is less than for a fixed frequency system, the cost and complexity of frequency diversity, requiring several parallel transmitters and receivers tuned to different frequencies, may be prohibitive.

The next logical step is to use only one transmitter and and one receiver, the frequency of which can be varied, and tune them to a frequency which propagates best at the moment. It has been found not only that fades can be remedied, but signal enhancement can also be obtained if the best propagating frequency is selected often and from a large number of frequencies; which means from a wide frequency band. By signal enhancement is meant that the received signal at the selected frequency is stronger than the long-time average signal received in a fixed frequency system. As indicated by the word "average," if the signal is at one time very weak during fades (much below average), it must be above average at another time. By frequently selecting the best frequency from a large range of frequencies, the average received signal can be enhanced or can have a value somewhat above the long-time average. Therefore, such a best frequency selection system will provide reliable communication with less transmitter power.

One disadvantage of the best frequency selection system which has been tried is that the transmission of information must be frequently interrupted in order to test the propagation and select the best frequency. The greater the number of interruptions to find the best frequency, the stronger the received signal will be, but this allows less time to transmit the desired information. The selection of the best frequency from a larger number of frequencies contributes to signal enhancement, but also prolongs the interruptions. The best frequency has to be selected often so that during the time this frequency is used for transmission only a small change of the received signal strength occurs.

SUMMARY OF THE INVENTION

It is an object of this invention to provide an improved troposcatter communication system with a plurality of information channels which are transmitted over the best frequency selected from a plurality of transmitting frequencies.

It is another object of the invention to provide a best frequency selection technique which may be employed without interrupting the flow of information.

It is a further object of the invention to provide a troposcatter communication system wherein the best frequency can be selected in very short time intervals in order to obtain good enhancement of the received signal with reduced transmission power and/or antenna gain.

It is still another object of the invention to provide reliable communication over a plurality of channels at long range wherein the equipment is relatively simple and inexpensive and does not require critical adjustments.

In practicing the invention, a two-way troposcatter digital communication system is provided for simultaneously transmitting a plurality of information channels using a plurality of transmitting frequency waves out of which periodically a single frequency wave is selected, which is the frequency wave that provides the best signal at each moment. The information in each voice channel is converted to a pulse train, and all pulse trains and the synchronizing signal are combined in a time-division multiplex circuit to provide modulation frames, each having a synchronizng channel and a plurality of signal channels. The modulation frames from the multiplex circuit are applied to a gate which selectively passes to an intermediate frequency (IF) mixer a frequency corresponding to the mark when a pulse is applied to the gate, and a frequency corresponding to the space when a space is present in the multiplex pulse train. The IF mixer is connected to a step oscillator which provides a plurality of frequencies for heterodyning the modulation frames of mark and space frequencies to a pair of intermediate frequencies which are further superimposed in a second mixer with a UHF or microwave frequency to produce a transmission frequency wave. The transmission frequency wave is amplified in a power amplifier and applied to a duplexer circuit for radiation by an antenna, which is also used as the receiving antenna. The received signal is passed through the duplexer and applied to a radio frequency (RF) amplifier. The output of the RF amplifier is applied to an IF mixer and superimposed with the frequency derived from a second mixer in which the UHF or microwave frequency is superimposed with the frequency of the step oscillator. The output of the IF mixer corresponds to the mark and space frequencies which, after amplification in an IF amplifier, are separated in a filter network and applied to the differential detector which provides positive or negative pulses in response to the mark or space frequency applied. The pulse train of the differential detector is applied to a channel separator and to a frame synchronizer. The channel separator provides voice channel outputs and a synchronizing channel output. The voice channel outputs are applied to the digital-to-analog converter which feeds the individual voice channels. A signal from the frame synchronizer is applied to the channel separator and also to a code and synchronization recovery circuit, which recognizes different codes and controls the best frequency selection and the switching to the best frequency. The best frequency selector is activated when a frequency selection code is recognized by the code and synchronization recovery circuit, the best frequency selection is made, and the code corresponding to the best frequency is stored in the buffer storage.

The buffer storage is coupled to frequency controls in the transmitter and receiver part, and as soon as the best frequency code is available to the transmitter frequency control, a signal is applied to the clock and code generator to provide the best frequency code transmission to the remote station on the synchronizing channel. The transmitted best frequency code is received in the remote station which uses a similar transmitter-receiver set. The code and synchronization recovery circuit recognizes the best frequency and applies a corresponding signal to the transmitter frequency control and after sending a switching code, switches the step oscillator to the new best frequency. Upon receiving the switching code, the opposite receiver also switches to the new best frequency, and stays in step with the transmitter. While the system is used with FSK modulation, other forms of modulation such as phase shift keying could be used.

The invention is illustrated in the drawings wherein.

DETAILED DESCRIPTION OF THE INVENTION

Figure 1:
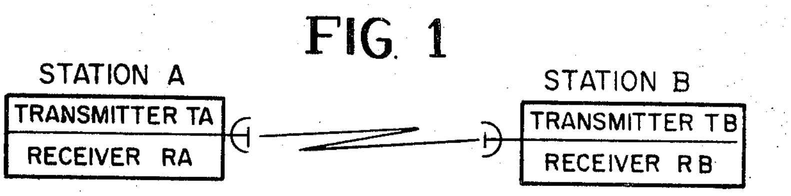
FIG. 1 shows a communication system between two different stations.

Referring now to the drawings, FIG. 1 shows station A consisting of a transmitter TA and a receiver RA. Station B consists of a transmitter TB and a receiver RB and communicates with station A over a two-way troposcatter link. The signals are continuously transmitted over two different frequency waves that provide the best signal at each moment in each direction. The best frequency is selected without interrupting the flow of information in a manner subsequently described.

Figure 2:
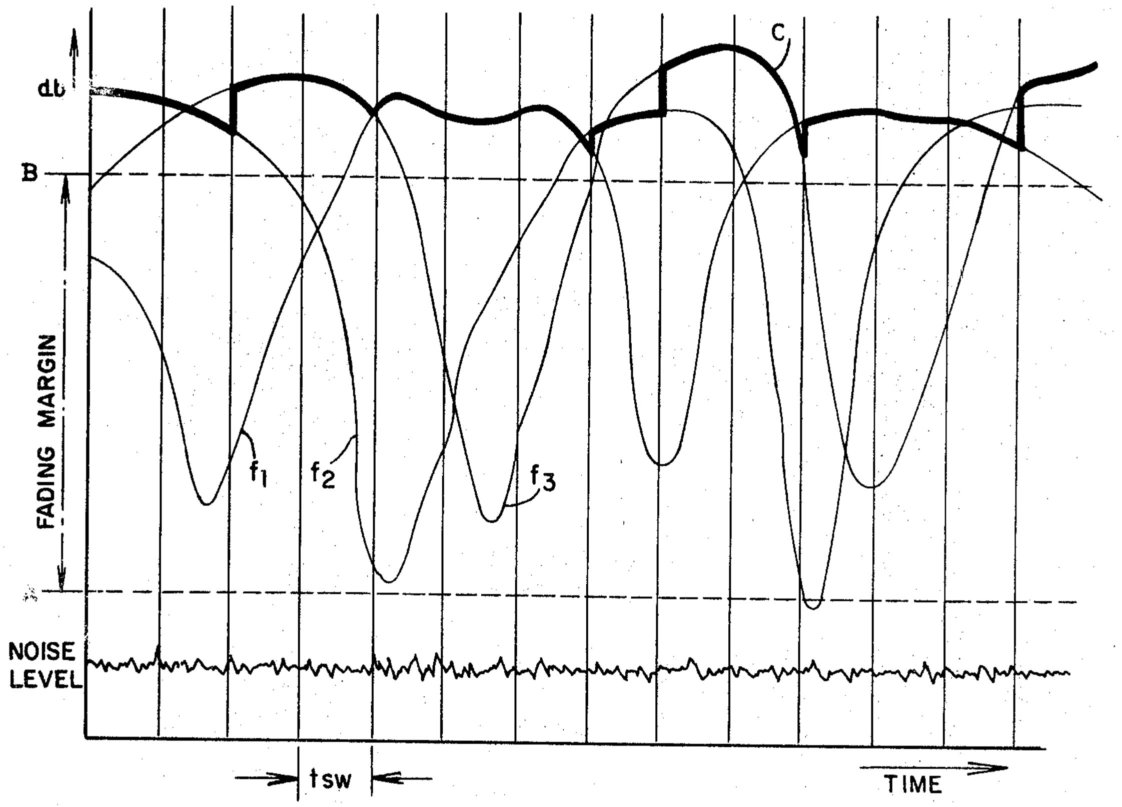
FIG. 2 is a diagram which illustrates the variation of the received energy in time at three different frequencies.

In order to describe the novel troposcatter communication system in which the signal is enhanced, FIG. 2 shows three curves which illustrate the variations of the received signal in time at frequencies $f_1$, $f_2$ and $f_3$. Each frequency occasionally suffers fades during which the received signal decreases to the minimum usable signal level A or even below it. In order to receive a signal whose average energy lies above the signal level B, the transmitter and receiver must be frequently switched to the frequency that provides the best signal at each moment. The frequency switching period $t_{sw}$ must be short in comparison to the fading periods so that there will be minimal signal changes when the particular best frequency is used. Only then can signal enhancement be continuously obtained. FIG. 2 shows the received signal power db versus time and the heavy curve C represents the received signal power when the best frequency is used.

In order to realize frequency switching without any interruption of the flow of information, the invention utilizes time-division multiplex for the various information channels, which are continuously transmitted over the frequency that provides the best signal at each moment. Best frequency selection is accomplished by signals transmitted over the synchronizing channel. Since the redundancy of the synchronizing pulses in the synchronizing channel is very large, all information necessary for a frequent selection of the frequency providing the best signal can be transmitted over that channel without interrupting the flow of information and without affecting synchronization.

Figure 3:
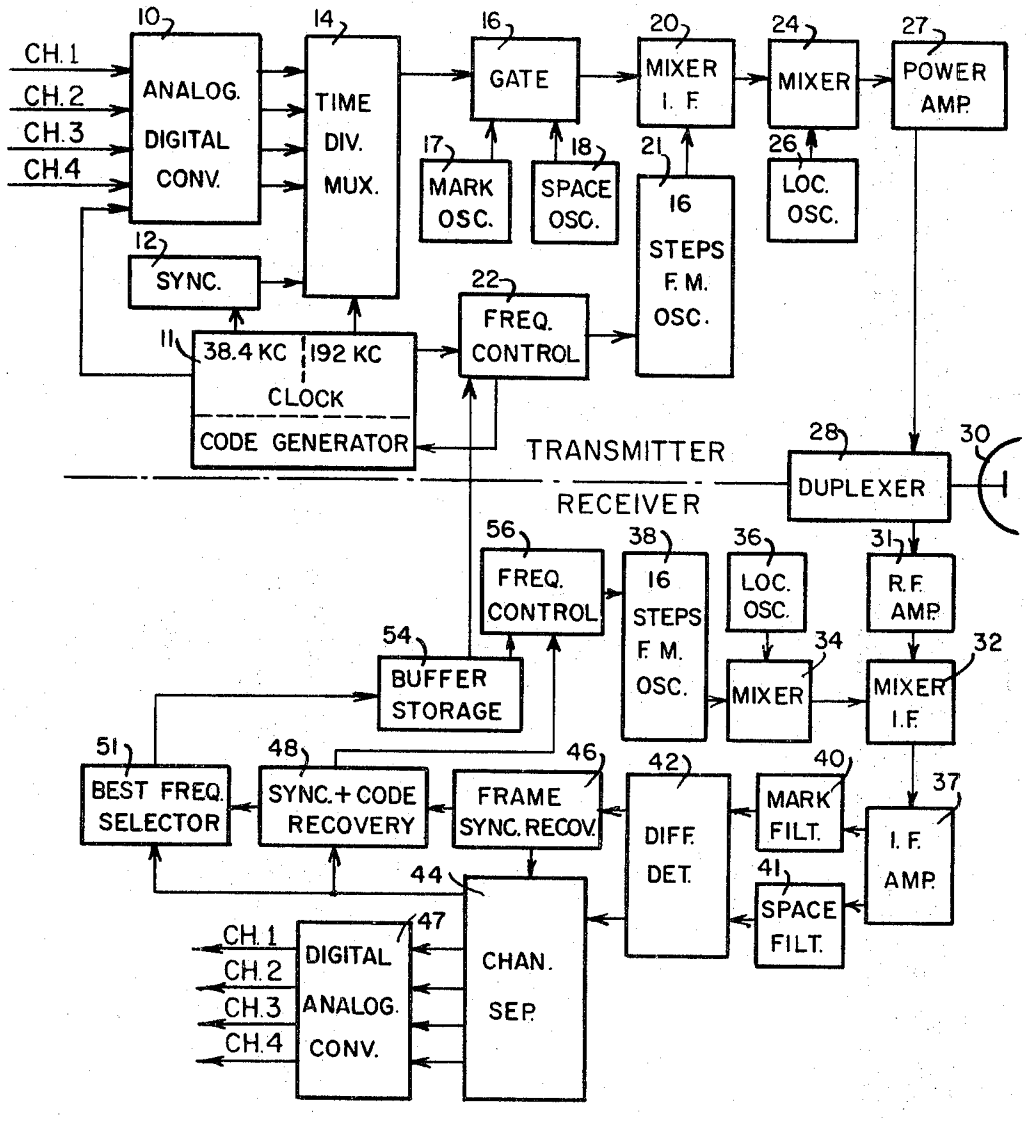
FIG. 3 is a block diagram of a digital communication system in accordance with the invention.

A digital troposcatter communication system in accordance with the invention, and which provides signal enhancement is shown in the block diagram of FIG. 3. In the transmitter a plurality of voice channels, such as the four channels CH1, CH2, CH3, CH4, are applied to an analog-to-digital converter 10. This converter may consist of several delta modulators which produce output pulse trains, corresponding to voice modulation in each channel. The converter 10 is connected to the clock and code generator 11 which provides sampling pulses for it, the pulse rate of these sampling pulses may be 38.4 kilocycles. The clock and code generator 11 also applies clock pulses to the synchronizing channel 12.

Figure 4:
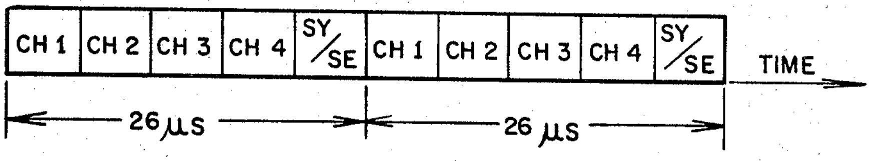
FIG. 4 shows two modulation frames used in the system of FIG. 3.

The signals from the converter 10 and synchronizing channel 12 are applied to a five channel time-division multiplexer 14. The time-division multiplexer derives one sample from each of the four pulse trains corresponding to the four voice channels and one from the synchronizing channel in sequence during each period between the 38.4 kilocycles sampling pulses, which corresponds to a time duration of approximately 26 microseconds. Thus, each 26 microsecond frame is divided into five pulses each 5.2 microseconds long, one for each voice channel and one for the synchronizing channel (see FIG. 4). Clock signals at this rate, correspond to 192 kc., are also applied from the clock and code generator 11 to the five-channel multiplexer 14.

The output signal from the multiplexer is in the form of a pulse train, and is applied to gate 16. A mark oscillator 17 and a space oscillator 18 of different frequencies are also coupled to the gate 16. Although separate oscillators are shown, they can be replaced by a single oscillator which is shifted in frequency. The gate 16 connects the mark oscillator 17 to the mixer 20 for producing an intermediate frequency when a pulse is applied from the multiplexer to the gate, and connects the space oscillator 18 to the mixer 20 when a space is present in the multiplexed pulse train.

The block diagram further shows a step oscillator 21 which is capable of being frequency modulated by sixteen steps over a 20 megacycle band, with the frequencies being spaced by 1.25 megacycles. The frequencies of the step oscillator are superimposed in the mixer 20 with the mark and space frequencies, so that sixteen frequency pairs can be produced. The timing of the step modulation of the step oscillator 21, and also the frequency step, which is selected for voice transmission, is controlled by a circuit 22, which is coupled to the step oscillator, the clock and code generator 11 and a buffer storage circuit 54 in the receiver. Alternatively 16 separate oscillators and gates could be used instead of the step oscillator 21.

The output of mixer 20 is applied to a second mixer 24 where the one pair selected out of the sixteen pairs of intermediate frequencies is superimposed with the frequency of local oscillator 26 working on a UHF or microwave frequency to produce the transmission frequencies of the system. After being amplified in a power amplifier 27, the signals are applied to a duplexer 28 for transmission by antenna 30.

The antenna 30 serves as both the transmitting and receiving antenna for the station. The received signal is branched off in the duplexer 28 and applied to an RF amplifier 31. The amplified signal is superimposed in a mixer 32 with a locally generated frequency to provide an intermediate frequency signal corresponding to the mark and space frequencies. The locally generated frequency is produced from the output of a step oscillator 38 and a local oscillator 36 (working on a UHF or microwave frequency) provided in the receiver, by heterodyning in a mixer 34. The derived mark and space frequencies are amplified in an intermediate frequency amplifier 37 and are separated by a mark filter 40 and a space filter 41. The mark filter 40 will produce an output when the mark frequency is transmitted, and the space filter 41 will produce an output when the space frequency is transmitted. The outputs of the mark and space frequency filters are applied to a differential detector 42 which provides positive pulses for mark frequencies and negative pulses for space frequencies in response to the signals applied thereto. Either of the detected signals will therefore provide an output required to reconstruct the multiplexed pulse train of the transmitted information, so that the differential detector 42 has in effect a redundant or diversity input, and the output therefrom is highly reliable and independent of applied signal strength.

The output of differential detector 42 is applied to a frame synchronization recovery 46 and also to a time division demultiplexer or channel separator 44. The channel separator 44 will produce five pulse outputs which correspond to the pulse inputs applied to the multiplexer 14 in the transmitter. In the event that voice channels CH1 to CH4 were applied through the analog-to-digital converter 10 at the transmitter, a digital-to-analog converter 47 is coupled to the four outputs of the channel separator 44 to reproduce the voice signals at the receiver. The frame synchronizer 46, recognizes the four voice channels and also the synchronizing channel in the received pulse train, and directs the synchronizing channel to the sychronization and code recovery circuit 48. The outputs of the channel separator 44 are so controlled by the frame synchronizer 46 that each output is congruous with the corresponding receiver channel output.

The code and synchronization recovery circuit 48 recognizes different codes as will be explained later, and controls the timing of switching of the receiver to the new best frequency. The synchronizing channel signal is also connected to the best frequency selector 51 which selects the best frequency in a manner to be described later. The best frequency selected is transferred from the selector to the buffer storage 54 in coded form. The buffer storage 54 is connected with frequecy controls 22 and 56 of the transmitter and the receiver, respectively. The code and synchronization recovery 48 is also connected to the frequency control 56 so that when the switch code is recognized, the receiver can be switched to the new best frequency and stay in step (sync) with the associated transmitter.

Figures 5, 6:
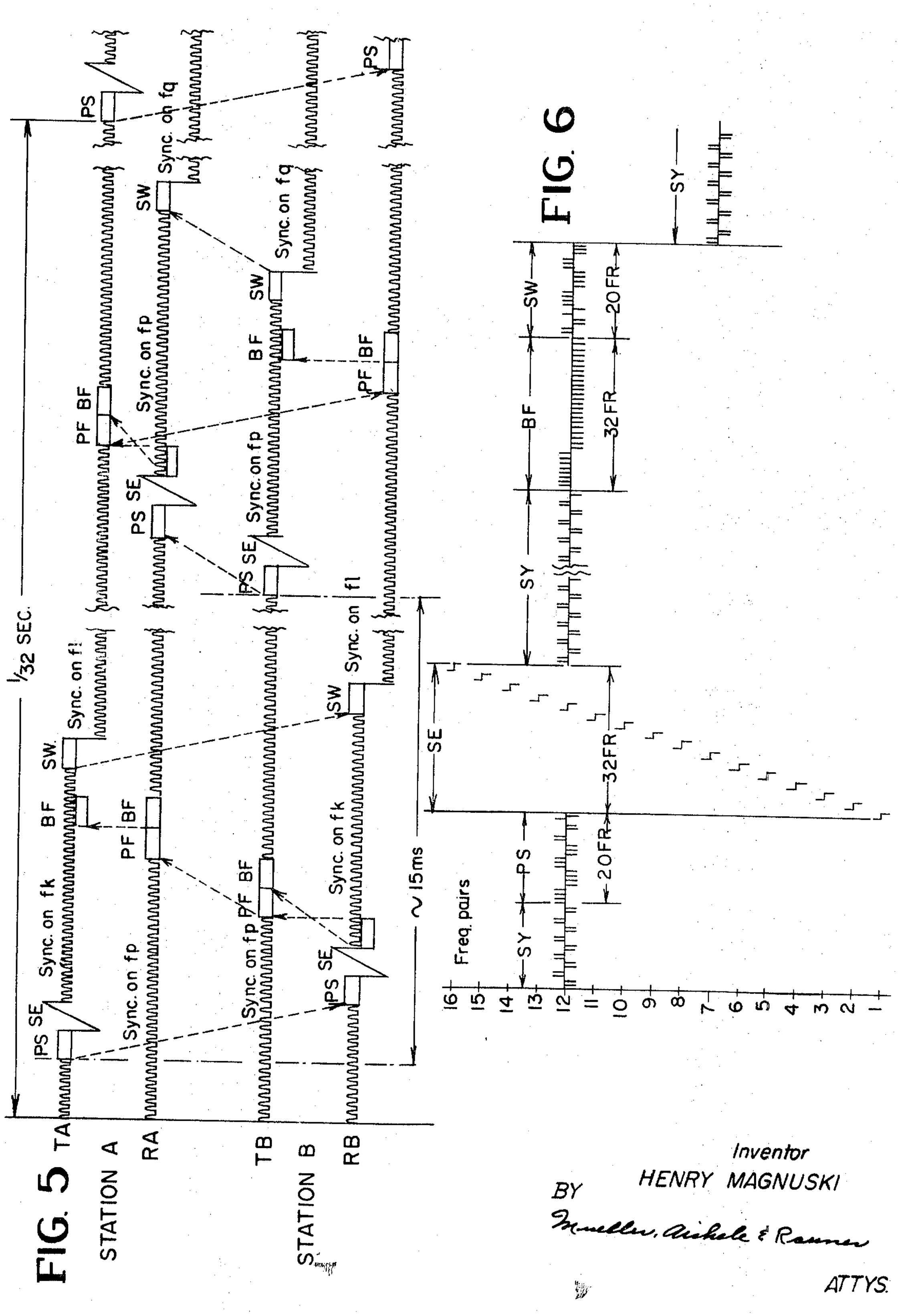
FIG. 5 is a diagram illustrating the different steps of the best frequency selection between two stations.
FIG. 6 shows an example of codes for the best frequency selection.

The selection of the best carrier frequency for transmission of information from station A to station B at any moment is made, for example, 32 times per second and is achieved in four steps (see FIG. 5).

(1) Transmitter $T_A$ starts the selection cycle by sending sample pulses SE on each of the available frequencies; 16 are assumed in this patent specification. This transmission of samples is preceded by transmission of the "prepare for samples" code PS to keep the tuning of receiver $R_B$ in step with the transmitted samples. After the sample signals SE, the transmission of synchronizing signals SY for the voice channels is resumed on the last selected best frequency *fk*.

(2) Receiver $R_B$ compares the sample pulses SE received at different frequencies and selects the frequency over which the strongest pulse was received. This frequency is in coded form and this best frequency code BF is retained in storage in receiver $R_B$ in order to switch receiver $R_B$ to the new best frequency later, immediately after the coded signal "switch" SW is received. The code BF is also supplied to transmitter $T_B$ for retransmission to receiver $R_A$.

(3) Transmitter $T_B$ retransmits the code BF to receiver $R_A$ to inform it of the next frequency to be used. This retransmission may also be preceded by a "prepare for frequency" code PF to facilitate recognition of the best frequency code BF as shown in FIG. 5. Receiver $R_A$, upon reception of code BF, sends it to transmitter $T_A$ frequency control.

(4) Shortly after receiving the code BF, transmitter $T_A$ initiates the switching to the new best frequency by sending the "switch" code SW and immediately thereafter transmits all information on the new best frequency (*fl* as shown on FIG. 5) and resumes the transmission of the usual synchronizing signals SY. Receiver $R_B$ also switches to the new best frequency *fl* immediately after receiving the SW code. In this way receiver $R_B$ keeps in step with transmitter $T_A$ and no interruption of communication occurs.

This procedure of the best frequency selection, coding, decoding and switching takes only a few milliseconds and its length depends on the distance between stations A and B and propagation delays. The same procedure is repeated approximately 15 msec. later in the opposite direction from transmitter $T_B$ to receiver $R_A$ to select a different best frequency, e.g., *fq* after transmission on the previously selected best frequency *fp*, for station B to station A transmission so that no overlapping of the process in time occurs. The station B to station A frequency is selected from a different frequency band as it is customary in two-way systems to separate receiving and transmitting frequencies about 100 mc. or more to avoid interferences from the transmitter to the receiver in the same station.

As already mentioned, one frame about 26 microseconds long is divided into five pulses 5.2 microseconds long, where 4 pulses are used for transmitting the four time division multiplexed voice channels. The fifth pulse serves as a synchronizing pulse and for providing the frequency hopping and frequency selection signal.

An example of a possible form of synchronizing pulses and frequency selection pulses as illustrated in FIG. 6 will be described. In order to simplify the diagram only hte fifth pulse in each 5-pulse group will be considered and shown, since only these pulses carry the synchronizing and frequency selecting information and the other four pulses carry the four voice channels. That means, that every vertical line characterizes either a mark or a space signal which follows the four voice channel pulses not shown.

As shown in FIG. 6, the synchronizing information for the voice channels can be in form of a sequence of 2 mark pulses and 2 space pulses. They are sent over a pair of frequencies which were previously selected as best. In the example, it is the frequency pair No. 12. The frequency selection process starts with prepare code PS which may be transmitted over 20 frames and which may be of the form of 4 mark pulses and 4 space pulses followed by 3 mark pulses, 3 space pulses; 2 mark pulses, 2 space pulses; and 1 mark and 1 space pulse. Next, 32 selection pulses SE will be sent in the following frames and may consist of one mark and one space pulse over 16 different frequency pairs starting with pair number one. This will permit the opposite receiver to register which pair of frequency waves is received best at this time. The selection pulses SE are followed by a long period of frames of synchronizing pulses for the voice channels. The selection pulses are received by the opposite receiver and a best frequency code BF is transmitted back after deciding which is the best received frequency.

The code of the new best frequency consists, e.g., for the new best frequency No. 7, of a binary number 0111, which will be transmitted as 8 spaces, and 3 x 8 mark pulses for 8 times redundant transmission. After the new best frequency code is received, a switch code SW is transmitted to the opposite receiver telling that the receiver should switch to the new frequency immediately after receiving the code. That switch code consists, e.g., of 20 frames with 2 mark, 2 space; 1 mark, 1 space; 1 mark, 1 space; 4 mark, 4 space; 3 mark and 3 space pulses. After this, the regular 2 mark, 2 space synchronizing signal transmission is resumed on the new frequency pair.

As already mentioned, a frame lasts 26 microseconds. Each period of 1/32 of a second contains 1200 frames which are each 26 microseconds long. Since the best frequency selection sequence will be repeated 32 times per second, and it lasts $$20(PS)+32(SE)+32(BF)+20(SW)=104$$

frames, the remaining 1096 frames will be filled with simple 2 mark 2 space signals for the voice channel synchronization. This arrangement gives ample time to stagger the transmission and reception of synchronizing pulses and the switching to new best frequency pairs.

Figure 7:
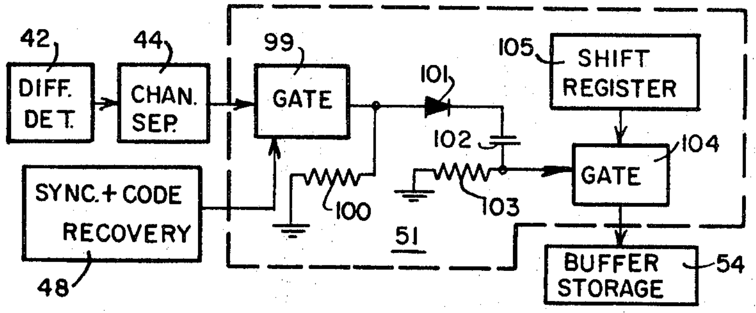
FIG. 7 is a schematic diagram of the best frequency selector.

There are many possible circuits which can be used to accomplish the best frequency selection. One such circuit which is favored, is shown in FIG. 7. The received pulses are rectified by a differential detector 42 and pass through channel separator 44 and gate 99, and appear across resistor 100 as short DC pulses of amplitudes approximately proportional to the signal strength received at each frequency. Gate 99 is controlled by synchronization and code recovery circuit 48 and opens only for frequency sample pulses (SE). Resistor 100 is connected through diode 101 to capacitor 102 in series with resistor 103. The first pulse received on frequency 1 will charge capacitor 102 to a voltage approximately equal to its amplitude. If the next pulse on frequency 2 is weaker, it will not charge capacitor 102. However, if at some other frequency, for example frequency 5, a stronger signal is received, additional charge will be supplied to capacitor 102 through diode 101. Each time capacitor 102 is charged, there is a voltage drop across resistor 103. This voltage drop, after suitable amplification, controls gate 104, which is interposed between shift register 105 and buffer storage 54. Storage 54 may be in the form of a simple register capable of storing a number from 1 through 16 when it is transmitted through gate 104 from shift register 105. The operation of the best frequency selection will proceed as follows: When frequency 1 is transmitted, the shift register 105 which is synchronized with frequency control 156, registers number 1. Capacitor 102 is charged and, due to the voltage drop across register 103, gate 104 is opened and number 1 is transferred from register 105 to buffer storage 54. As the consecutive sample pulses are received from frequency 2, 3, 4, etc., shift register 105 registers 2, 3, 4, etc. However, these numbers will not be transferred to the buffer storage 54 unless a signal stronger than that received on frequency 1 was received. Assuming that the signal on frequency 5 was stronger than on frequency 1, additional charge will be supplied to capacitor 102, gate 104 will be opened and number 5 will be transferred from shift register 105 to buffer storage 54 and remain there in place at number 1. If again later a signal on another frequency, let us assume on frequency 13, is still stronger than the signal on frequency 5, the same operation will be repeated and number 13 will be transferred to the buffer storage 54. If signals on other frequencies are weaker on frequency 13, there will be no more transfer of numbers to buffer storage 54. As can be seen from this description, at the end of the frequency selection period, the buffer storage will carry a number corresponding to the frequency on which the strongest signal was received. This number is encoded as code BF (best frequency) and later transmitted to the opposite transmitter. The encoding of the best frequency number can be in simple binary representation as for example 1101 for frequency 13. This frequency code is retained in the receiver and also transmitted to the transmitter as previously described, to permit switching to the new best frequency of both the transmitter and the receiver in synchronism, immediately after switch code SW is transmitted and received.

The system may have a provision to revert to a predetermined frequency, such as frequency 1, in case communication is interrupted. The system will then transmit over this frequency until synchronism is restored.

Figures 8, 9:
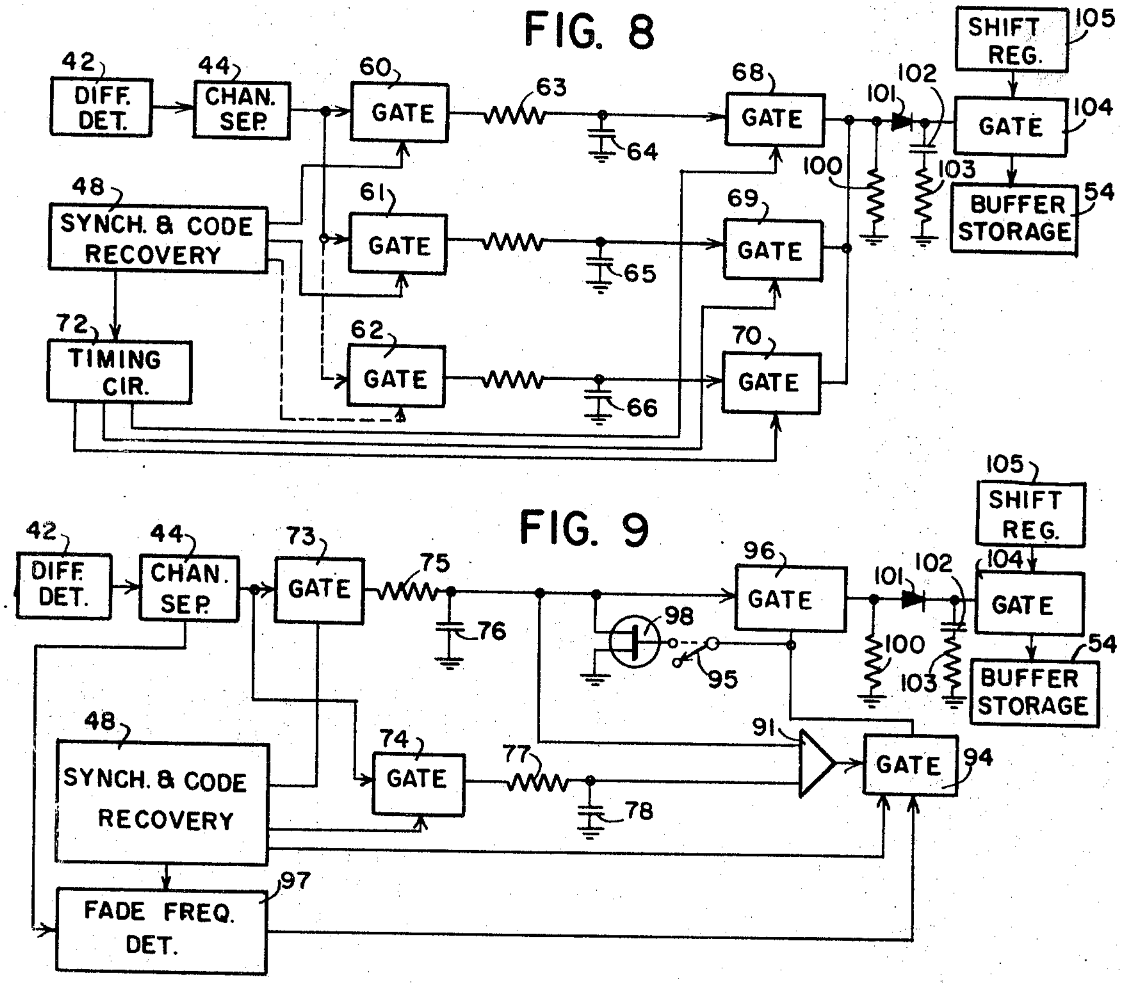
FIG. 8 is a partial schematic and partial block diagram of an embodiment of the invention useful when noise is present.
FIG. 9 is a partial schematic and partial block diagram useful when the received signals are subject to flutter.

While the troposcatter communication system described above works well, problems may arise if a large amount of noise energy is present. If the received signal is weak, then noise peaks can be added to the test pulses and would upset the best frequency selection. For example, a very weak frequency might be selected as the best frequency because a strong noise peak occurred at the time test pulse on this frequency was being received. To correct this problem several test pulses on each frequency could be used and their received amplitudes added together or averaged so that the occasional noise peaks will have a minimum influence on the best frequency selection. A circuit for minimizing the influence of noise on best frequency selection is shown in FIG. 8.

The output of channel separator 44 is applied to each of gates 60, 61 and 62, there being one gate for each different frequency. Synchronizing and code recovery circuit 48 provides an actuating pulse for gates 60–62 and for the timing circuit 72. Before making a frequency selection a number of test pulses are transmitted on each frequency to be tested. The pulses may be transmitted in a sequence of different frequencies which is repeated or the pulse of one frequency may be repeated several times before proceeding to the next frequency.

Synchronization and code recovery circuit 48 applies signals to gates 60–62 to open the proper gate upon the reception of a signal at each frequency. Thus all of the signals received on one frequency would be transferred through gate 60 and resistor 63 to charge capacitor 64. The signals received on a second frequency would be coupled through gate 61 and resistor 67 to capacitor 65. As each frequency is tested, the signal charges the proper capacitor and is added to the charge already stored on the capacitor. By this means the total charge stored on each of the capacitors is more representative of the strength of the received signal as the noise would tend to average out over the period of reception of several pulses.

After a number of pulses have been received and stored on capacitors 64, 65 and 66 timing circuit 72 provides actuating signals to sequentially open gates 68, 69, 70 to apply the pulses to the best frequency selection circuit. The best frequency selection circuit consists of diode 101, resistor 100, capacitor 102, resistor 103, shift register 105, gate 104 and buffer storage 54. This circuit is the same as that shown in FIG. 7 and operates in a manner previously described to select the best frequency.

Another problem occurring with troposcatter communication systems is fast fading such as is observed when an airplane flies through the troposcatter path. The reflection from the plane provides additional signal energy which adds or subtracts in phase from the normally received troposcatter signal. This causes rapid cyclical fading of the received signal and these fades may be as fast as 50 per second. Any frequency, including the best one, may and usually will be the subject of these fades for a short period of time. If the system is switched to the frequency which is just about to fade then communication may be interrupted and the system synchronization lost. One solution to this problem is to speed up the process of selecting the best frequency by testing fewer frequencies, and/or using an additional channel instead of sync channel to test the frequencies continuously and/or reducing redundancy in testing frequencies and in sending the different codes shown on FIG. 5. An additional solution to this problem is to avoid selection of frequencies which are declining in amplitude during the test period and to select frequencies which are increasing in amplitude. A circuit for accomplishing this is shown in FIG. 9.

As previously described, the test frequency signal is separated by channel separator 44 and coupled to two gates 73 and 74. Gate 74 is opened at the start of the frequency test period by the Synch and Code Recovery circuit 48 and several test samples are permitted to charge capacitor 78 via resistor 77. In the second half of the test period, gate 74 is closed but gate 73 is open and an equal number of test samples are permitted to charge capacitor 76 via resistor 75. These two capacitors 76 and 78 are coupled to a differential amplifier 91 which compares the charges (voltages) accumulated on these capacitors. If the amplitude of the tested frequency decreased during the test period, then capacitor 76 will have a smaller charge than 78 and the output of the amplifier 91 will be negative; and vice versa, it will be positive if the amplitude increased. The output of 91 is coupled to gate 94 which is so arranged that it can be opened by the pulse from circuit 48 only when the output of 91 is negative. The negative output of 91, when passed by gate 94, can either disable gate 95, thus disconnecting capacitor 76 from the best frequency selection circuit previously described, or make conductive (bias) a field effect transistor 92 to reduce the charge of capacitor 76 before it is applied to the best frequency selection circuit. By this means, the system can still select a frequency whose signal is decreasing in amplitude but the selection is handicapped according to the amount of the decrease. Switch 93 permits the selection of the two possible functions of gate 94 as desired; either completely blocking the selection of decreasing frequency or handicapping it.

The system shown in FIG. 9 should normally not be used unless the frequency of fading exceeds a certain threshold such as, for example (but not limited to), 10 fades per second. The fade frequency detector 97 is coupled to channel separator 44 to detect the fade rate of the received signals and develops a control signal when the fade rate is above a predetermined threshold. This control signal is coupled to gate 94 to open this gate. With the fade rate below the threshold level, gate 94 is closed and the received signals are applied directly to the best frequency selection circuit. The fade rate detector may, for example, consist of an amplitude modulation detector which develops an AC signal having a frequency equal to the fade rate followed by a filter which rejects signals below a predetermined frequency.

Another problem which may occur in using the system of this invention is best frequency selection when interference or jamming is present on a particular frequency. If the band corresponding to one of the frequencies to be tested is occupied by a strong CW carrier, this carrier may cause this frequency to be selected as the best frequency even though, because of the interference, it is not the best frequency. In order to overcome this problem the system of FIG. 10 can be used.

Figure 10:
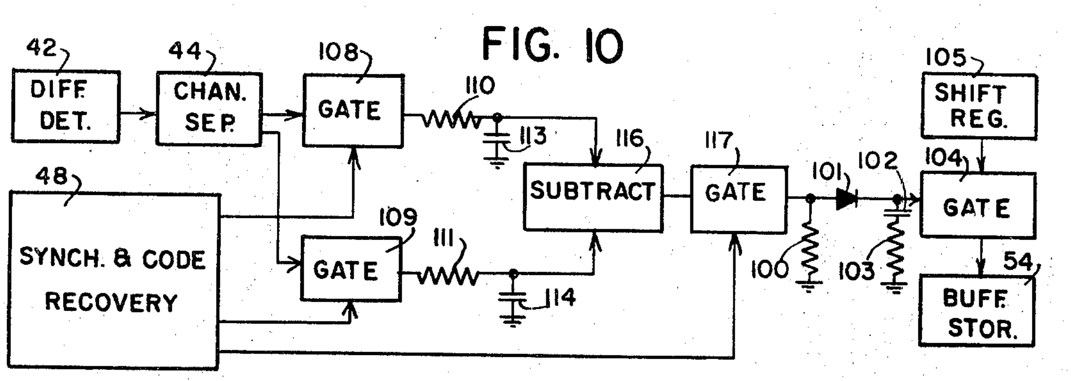
FIG. 10 is a partial schematic and partial block diagram of an embodiment useful when interference is present.

In the system of FIG. 10 two time slots (of the synchronizing period) are used to test the best frequency. During both time slots the receiver is tuned to the particular frequency to be tested, however, during the first time slot the transmitter does not transmit any signal. Thus during this time slot the receiver is listening only to the interference or noise which may be present on the frequency being tested. During the period of the first time slot, gate 108 is opened by a signal from synchronization and code recovery circuit 48, applying the signals received to capacitor 113 through resistor 110. The amplitude of the signal received is stored on capacitor 113. During the period of the second time slot the signal is transmitted by the transmitter on the same frequency and the received signal is applied from channel separator 44 through gate 109, resistor 111 to capacitor 114. The charge on capacitor 113, representing the strength of the signal received during the period of no transmission, is subtracted, in subtraction circuit 116, from the charge on capacitor 114, representing the strength of the signal received during the period of transmission, to develop a subtraction signal. The subtraction signal is applied to the best frequency selection circuit through gate 117 and the best frequency circuit determines the best frequency in the manner previously described.

The advantage of the invention is that by selecting the best frequency, the received signal will be a few db above the long time average signal. Since no fading margin is required, 20 to 40 db less transmitted power and/or antenna gain is required to provide the same signal quality. This permits much lighter and smaller troposcatter equipment. Further, this advantage is obtained without interrupting the information flow and without requiring temporary information storage facilities for the information to be transmitted later.

This system can be considered as a multiple frequency diversity system (operating on 16 frequencies as described) except that the power is transmitted on the single frequency which propagates best at each moment. It has the advantage over the usual frequency diversity system that the available transmission power is not divided between different frequency channels; however, signal enhancement can be calculated by assuming a multiple frequency diversity system.

I claim:

1. A troposcatter communication system for operation between first and second stations using waves of a plurality of frequencies from which the single frequency which provides the best transmission is selected periodically, said communication system including in combination, a first transmitter and a first receiver coupled thereto positioned at the first station, a second transmitter and a second receiver coupled thereto positioned at the second station, said first transmitter including means for receiving a plurality of individual information signals, signal generator means for generating synchronizing signals and frequency selection signals, and combining means coupled to said signal generator means and said means for receiving a plurality of signals to provide a first plurality of modulation frames each having a synchronizing channel with a synchronizing signal therein and a second plurality of modulation frames each having a synchronizing channel with a frequency selection signal therein, each of said modulation frames of said first and second pluralities also including a plurality of channels with information signals therein, said first transmitter further including frequency generator means for generating a plurality of waves of different frequencies and frequency selecting means coupled to said frequency generator means and to said combining means for selecting one of said plurality of waves for transmission of said modulation frames except for said channels with a frequency selection signal therein in each of said modulation frames of said second plurality, said frequency selecting means being responsive to said frequency selection signals of said second plurality of modulation frames to cause said frequency generator means to transmit periodically in a particular order predetermined ones of said waves of different frequencies, said second receiver including means responsive to said predetermined waves of different frequencies transmitted by said first transmitter to select the best frequency for troposcatter transmission.

2. The troposcatter communication system of claim 1 wherein said second receiver includes means for providing a signal indicating said best frequency for troposcatter communication and means coupling said best frequency signal to said second transmitter, said second transmitter transmitting said best frequency signal to said first receiver, said frequency selection means of said first transmitter being coupled to said first receiver and responsive to said best frequency signal to cause said frequency selection means to select said best frequency for transmission of said modulation frames.

3. The troposcatter communication system of claim 2 wherein said second receiver includes means responsive to the received waves associated with said frequency selection signals to change the frequency response of said second receiver in step with said plurality of different frequencies at which said predetermined ones of said waves are transmitted, so that such waves are received by said second receiver.

4. The troposcatter communication system of claim 2 wherein said means for providing a signal indicating said best frequency includes, channel separation means for separating said synchronizing channels and said information channels of said modulation frames, synchronizing and code signal recovery means coupled to said channel separating means and responsive to said synchronizing signals and said frequency selection signals to develop control signals, signal strength measuring means, input gate means coupled to said synchronizing and code signal recovery means and coupling said channel separating means to said signal strength measuring means, said input gate means being responsive to said control signals to couple said frequency selection signals to said signal strength measuring means, said signal strength measuring means acting to measure the strength of each of said frequency selection signals and to select the best frequency for troposcatter transmission.

5. The troposcatter communication system of claim 2 wherein, said combining means of said first transmitter provides one channel in each of said modulation frames of said second plurality of modulation frames in which no signal is transmitted, said second receiver being tuned to the same frequency during reception of said one channel and of said synchronizing channel of the same modulation frame, channel separation means for separating said synchronizing channel and the other channels of each modulation frame, first and second input gate means coupled to said channel separation means, synchronizing and code signal means coupled to said channel separation means and said first and second input gate means and responsive to said frequency selection signals to develop control signals, first and second storage means coupled to said first and second input gate means respectively, said first and second input gate means being responsive to said control signals to apply said frequency selection signal to said first storage means and to apply the signal on said one channel to said second storage means, subtraction means coupled to said first and second storage means for subtracting the signal in said second storage means from the signal in said first storage means to develop a subtraction signal, signal strength measuring means, output gate means coupled to said synchronizing and code signal recovery means and coupling said subtraction means to said signal strength measuring means, said output gate means being responsive to said control signals to couple said subtraction signal to said signal strength measuring means, said signal strength measuring means acting to measure the strength of each of said subtraction signals and to select the best frequency for troposcatter transmission.

6. The troposcatter communication system of claim 4 wherein, said signal strength measuring means includes output means, frequency selection signal indication means, and output gate means coupling said frequency selection signal indication means to said output means, storage and comparing means coupled to said input and output gate means, said storage and comparing means acting to compare each of said frequency selection signals with the frequency selection signal stored therein and to store the larger of the two, said storage and comparing means further acting to open said output gate means with the input frequency selection signal being larger than the stored frequency selection signal whereby a signal indicating the frequency of said input frequency selection signal is transferred to said output means.

7. The troposcatter communication system of claim 2 wherein, said means for providing a signal indicating said best frequency includes, channel separation means for separating said synchronizing channel and said plurality of information channels, synchronizing and code signal recovery means coupled to said channel separating means and responsive to said synchronizing signals to develop control signals, a plurality of storage means, a plurality of input gate means each coupled to said synchronizing and code signal recovery means and coupling said channel separating means to separate ones of said storage means, said input gate means being responsive to said control signals to apply said frequency selection signals to said storage means so that each storage means receives a plurality of frequency selection signals all transmitted at the same frequency, said storage means acting to add said frequency selection signals applied thereto, signal strength measuring means, a plurality of output gate means each coupling a separate one of said storage means to said signal strength measuring means, timing circuit means coupled to said synchronizing and code signal recovery means and to each of said output gate means, said timing circuit means being responsive to said control signals to develop periodically a series of timing signals, said plurality of output gate means being responsive to said timng signals to couple selectively said frequency selection signals stored in said storage means to said signal strength measuring means, said signal strength measuring means acting to measure the strength of each of said frequency selection signals and to select the best frequency for troposcatter transmission.

8. The troposcatter communication system of claim 2 wherein, said means for providing a signal indicating said best frequency includes, channel separation means for separating said synchronizing channel and said plurality of information channels, synchronizing and code signal recovery means coupled to said channel separating means and responsive to said synchronizing signals and said frequency selection signals to develop first control signals with said frequency selection signals present, first input gate means coupled to said channel separation means and said synchronizing and code signal recovery means, first and second storage means coupled to said first input gate means, said first input gate means being responsive to said first control signal to transfer said frequency selection signals to said first and second storage means, amplifier means, a plurality of third storage means, a plurality of second input gate means coupled to said synchronizing and code signal recovery means and each coupling a separate one of said third storage means to said first storage means, a plurality of first output gate means coupled to said synchronizing and code signal recovery means and each coupling a separate one of said third storage means to said amplifier means, said second input gate means and said first output gate means being responsive to said first control signals to selectively couple said first and third storage means and said amplifier means according to the transmission frequency of said frequency selection signal stored in said first storage means, said frequency selection signals stored in said first and third storage means causing a flow of current therebetween whereby said frequency selection signal stored in said first storage means is transferred to said third storage means, said amplifier means being responsive to a predetermined polarity and magnitude of said flow of current to develop a second control signal, signal strength measuring means, second output gate means coupled to said amplifier means and coupling said second storage means to said signal strength measuring means, said second output gate means being responsive to said second control signal to apply said frequency selection signal stored in said second storage means to said signal strength means, said signal strength measuring means acting to measure the strength of each of said frequency selection signals applied thereto and to select the best frequency for troposcatter transmission.

9. The troposcatter communication system of claim 8 and further including, fade frequency detection means coupled to said channel separation means and said synchronizing and code recovery means, said fade frequency detection means being responsive to the frequency of fading to develop a third control signal with said frequency of fading below a predetermined level, further gate means coupled to said fade frequency detection means and coupling said amplifier means to said second output gate means, said further gate means being responsive to said third control signal to block said second control signal from said second output gate means.

10. The troposcatter communication system of claim 8 and further including, attenuation means coupled to said amplifier means and said second storage means, said attenuation means being responsive to said second control signal to reduce the magnitude of said frequency selection signal stored in said second storage means in accordance with said magnitude of said flow of current.

11. A troposcatter communication system for operation between first and second stations using waves of a plurality of frequencies out of which is selected periodically the single frequency wave which provides the best transmission, such system including in combination; a first transmitter having first transmitter output means and a first receiver provided at the first station; a second transmitter having second transmitter output means and a second receiver provided at the second station; means at each of said transmitters for converting the information of a plurality of individual signal inputs to pulse trains; clock and code generator means for generating synchronizing signals, and frequency selected signals and best frequency code signals interspersed with said synchronizing signals; said clock and code generator means being coupled to said converting means; time division multiplex means coupled to said converting means and to said generator means to provide modulation frames each having a synchronizing channel and a plurality of signal channels; said synchronizing channel comprising successively said synchronizing signals, frequency selection signals and best frequency code signals; mixer means at each station including oscillator means providing a plurality of frequency waves for heterodyning said modulation frames to a transmission frequency and for reconverting said received modulation frames at the receiver; means at each of said receivers for demodulating said modulation frames, frequency selection and frequency control means at each station coupled to said demodulating means for providing control signals; said control signals being applied to said generator means and said oscillator means and causing the transmission of the synchronizing channel portion of said modulation frames in order over the plurality of transmitting frequency waves by said first transmitter output means; said second receiver being responsive to the plurality of transmitting frequency waves; said frequency selection and frequency control means at each station further comprising synchronization and code recovery circuit means coupled to said demodulation means including frame synchronizer means and channel separator means, and further comprising best frequency selector means, buffer storage means and first and second frequency control means; said best frequency selector means coupled to said channel separator means and said buffer storage means; said synchronization and code recovery circuit means coupled to said frame synchronizer means and said channel separator means to recognize different codes transmitted through said synchronizing channel; said synchronization and code recovery circuit further coupled to said best frequency selector means; said best frequency selector means selecting the best frequency and controlling the application of said selected best frequency indicating signal to said buffer storage means for storing the best frequency indicating signals; said synchronization and code recovery circuit means and said buffer storage means further coupled to said first frequency control means which is coupled to said oscillator means in the receiver of each station, said first frequency control means executing the switching to the new best frequency wave when the switch code is recognized by said synchronization and code recovery circuit means; said second frequency control means coupled to said buffer storage, said clock and code generator means and said oscillator means in the transmitter of each station; said second frequency control means executing the switching to the new best frequency wave when the switch code is transmitted by the transmitter.

12. A troposcatter communication system according to claim 11 in which said best frequency selector comprises first gate means having first and second input and first output means; said first input means coupled through said channel separator to said differential detector, said input means coupled to said synchronization and code recovery circuit means; said first output means connected through a first resistor to a reference potential and further in parallel through a diode in series with a capacitor and a second resistor to said reference potential; said first gate means being controlled by said synchronization and code recovery circuit means to open said gate for frequency selecting signals which are applied to said capacitor to charge said capacitor to a level according to the power of the best frequency received; second gate means having third and fourth input and second output means; shift register means connected to said fourth input means; said third input means connected to the junction of said capacitor and said second resistor; said second output means connected to said buffer storage and passing a signal corresponding to the charge of said capacitor to said buffer storage when said shift register opens the gate at said signal power indicating the best frequency.

13. A troposcatter communication apparatus having a transmitter and a receiver part and including in combination, means in the transmitter part for converting the information of a plurality of individual signal inputs to pulse trains; clock and code generator means for generating synchronizing signals, and frequency selection signals and best frequency code signals interspersed with said synchronizing signals; said clock and code generator means being coupled to said converting means; time division multiplex means coupled to said converting means and to said generator means to provide modulation frames each having a transmitter synchronizing channel and a plurality of transmitter signal channels; said synchronizing channel comprising successively said synchronizing signals, frequency selection signals and best frequency code signals; first mixer means coupled to said time division multiplex means; first oscillator means providing a plurality of different frequency waves coupled to said first mixer means for heterodyning said modulation frames with one of the plurality of said different frequency waves to a transmission frequency; transmitter output means for transmitting said heterodyned modulation frames to a remote station; receiver input means for receiving said remotely transmitted heterodyned modulation frames; second mixer means coupled to said receiver input means; second oscillator means providing a plurality of different frequency waves coupled to said second mixer for converting said received modulation frame to a sampled pulse train including receiver signal channels and a receiver synchronizing channel; demodulation means coupled to said second mixer means demodulating said sampled pulse train providing the information of said receiver signal channels and recovering the signal of said receiver synchronizing channel; frequency selection and frequency control means coupled to said modulation means and comprising synchronization and code recovery circuit means coupled to said demodulation means including frame synchronizer means and channel separator means, and further comprising best frequency selector means, buffer storage means and first and second frequency control means; said best frequency selector means coupled to said channel separator means and said buffer storage means; said synchronization and code recovery circuit means coupled to said frame synchronizer means and said channel separator means to recognize different codes transmitted through said synchronizing channel; said synchronization and code recovery circuit further coupled to said best frequency selector means; said best frequency selector means selecting the best frequency and controlling the application of said selected best frequency indicating signal to said buffer storage means for storing the best frequency indicating signals; said synchronization and code recovery circuit means and said buffer storage means further coupled to said first frequency control means which are coupled to said second oscillator means; said first frequency control means executing the switching to the new best frequency wave when the switch code is recognized by said synchronization and code recovery circuit means; said second frequency control means coupled to said buffer storage, said clock and code generator means and said first oscillator means, said second frequency control means executing the switching to the new best frequency wave when the switch code is transmitted by the transmitter.

14. A troposcatter communication apparatus according to claim 13 in which said best frequency selector comprises first gate means having first and second input and first output means; said first input means coupled through said channel separator to said differential detector, said second input means coupled to said synchronization and code recovery circuit means; said first output means connected through a first resistor to a reference potential and further in parallel through a diode in series with a capacitor and a second resistor to said reference potential; said first gate means being controlled by said synchronization and code recovery circuit means to open said gate for frequency selecting signals which are applied to said capacitor to charge said capacitor to a level according to the power of the best frequency received; second gate means having third and fourth input and second output means, shift register means connected to said fourth input means; said third input means connected to the junction of said capacitor and said second resistor; said second output means connected to said buffer storage and passing a signal corresponding to the charge of said capacitor to said buffer storage when said shift register opens the gate at said signal power indicating the best frequency.

References Cited

UNITED STATES PATENTS

| | | | |
|---|---|---|---|
| 2,457,986 | 1/1949 | Edson | 343—176 |
| 2,521,696 | 9/1950 | De Armond | 325—51 |
| 2,680,153 | 6/1954 | Boothroyd et al. | 343—203 X |
| 3,001,064 | 9/1961 | Alexis et al. | 325—63 X |
| 3,117,305 | 1/1964 | Goldberg | 325—30 X |
| 3,160,813 | 12/1964 | Biggi et al. | 325—56 X |
| 3,443,228 | 5/1969 | Brenner et al. | 325—56 |

RICHARD MURRAY, Primary Examiner

B. V. SAFOUREK, Assistant Examiner

U.S. Cl. X.R.

179—15; 325—63, 65; 343—176, 204